(12) United States Patent
Lee et al.

(10) Patent No.: US 7,358,102 B2
(45) Date of Patent: Apr. 15, 2008

(54) METHOD FOR FABRICATING MICROELECTROMECHANICAL OPTICAL DISPLAY DEVICES

(75) Inventors: Chia-Sheng Lee, Taichung (TW); Han-Tu Lin, Wuci Township, Taichung County (TW); Jia-Fam Wong, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 344 days.

(21) Appl. No.: 11/093,498

(22) Filed: Mar. 30, 2005

(65) Prior Publication Data

US 2006/0148262 A1    Jul. 6, 2006

(30) Foreign Application Priority Data

Dec. 31, 2004  (TW) .............................. 93141738 A

(51) Int. Cl.
   *H01L 21/00*   (2006.01)
(52) U.S. Cl. .................. 438/29; 438/704; 257/432; 257/E21.232; 359/291
(58) Field of Classification Search .................. 438/29, 438/704; 257/432, E21.232; 359/291
   See application file for complete search history.

(56) References Cited

U.S. PATENT DOCUMENTS

| | | | |
|---|---|---|---|
| 5,652,671 A * | 7/1997 | Knipe et al. ................. 359/291 |
| 5,835,255 A | 11/1998 | Miles ........................ 359/291 |
| 6,958,847 B2 * | 10/2005 | Lin ............................ 359/295 |
| 7,016,099 B2 * | 3/2006 | Ikeda et al. ................. 359/291 |
| 2002/0015215 A1 | 2/2002 | Miles ........................ 359/290 |
| 2002/0183977 A1 * | 12/2002 | Sui et al. .................... 702/188 |
| 2003/0027636 A1 | 2/2003 | Covannon et al. ............ 463/42 |
| 2003/0152872 A1 | 8/2003 | Miles ........................ 430/313 |
| 2003/0203627 A1 * | 10/2003 | Pang ......................... 438/689 |

* cited by examiner

*Primary Examiner*—B. William Baumeister
*Assistant Examiner*—Steven J. Fulk
(74) *Attorney, Agent, or Firm*—Thomas, Kayden, Horstemeyer & Risley

(57) ABSTRACT

A Method of forming microelectromechanical optical display devices is provided. A sacrificial layer is formed above a substrate. A plurality of posts penetrating the sacrificial layer is formed. A reflective layer and a flexible layer are sequentially formed above the sacrificial layer and the posts. A photoresist layer is formed on part of the flexible layer. By performing wet etching using the photoresist layer as a mask, a portion of the flexible layer is removed to form a patterned flexible layer. The wet etching is stopped on the reflective layer. The photoresist layer is removed. By performing dry etching using the patterned flexible layer as a mask, a portion of the reflective layer is removed to form a patterned reflective layer. A mechanical layer is formed with the patterned flexible and reflective layers. The sacrificial layer is removed to release the mechanical layer.

24 Claims, 9 Drawing Sheets

METHOD FOR FABRICATING MICROELECTROMECHANICAL OPTICAL DISPLAY DEVICES

This application claims the benefit of Taiwan application Ser. No. 93,141,738 filed Dec. 31, 2004, the subject matter of which is incorporated herein by reference.

BACKGROUND

The invention relates to microelectromechanical system (MEMS) processes, and more particularly, to microelectromechanical optical (MEMO) display device processes.

A wide variety of optical devices may currently be fabricated using micromachining and microelectronic fabrication techniques.

In some cases, for example, MEMS devices may comprise optical components, specifically referred to as MEMO display devices. One example of a MEMO display device is the interference modulator described in U.S. Pat. No. 5,835,255, which may be fabricated in an array and used in a reflective display wherein each interference modulator serves as a pixel to provide a desired optical response.

FIG. 1 shows a side view of a conventional interference modulator in two states. Referring to FIG. 1, numeral 102 denotes a pixel in an undriven state and numeral 104 denotes a pixel in a driven state. In the driven state, a mirror plate 110 is in direct contact with a substrate 120 such that the interference modulator absorbs incident light and appears black to a viewer 140 through the substrate 120. In the undriven state, an air gap 112 exists between the mirror plate 110 and the substrate 120 such that the interference modulator appears to be a bright color (for example, blue). Additionally, numeral 130 denotes a post for supporting the mirror plate 110.

U.S. Patent Application Publication No. 2002/0015215 to Miles, the entirety of which is hereby incorporated by reference, discloses a method for forming an interference modulator, comprising patterning an aluminum layer to form a mirror plate.

U.S. Patent Application Publication No. 2003/0152872 to Miles, the entirety of which is hereby incorporated by reference, discloses a method for forming an interference modulator, comprising forming a stack layer on a substrate and exposing a photosensitive layer deposited thereon using the stack layer as a photomask.

U.S. Patent Application Publication No. 2003/0027636 to Miles, the entirety of which is hereby incorporated by reference, discloses a method for forming an interference modulator, comprising forming a light-absorbing layer on a portion of a substrate.

SUMMARY

Methods of forming microelectromechanical optical display devices are provided. In an exemplary embodiment of forming a microelectromechanical optical display device, an optical stack layer is formed on a substrate. A sacrificial layer is formed on the optical stack layer. The sacrificial layer is patterned to form a plurality of holes therein. A supporting material fills the holes to form a plurality of posts. A reflective layer is formed on the sacrificial layer and the posts. A flexible layer is formed on the reflective layer. A photoresist layer is formed on a portion of the flexible layer. By performing a wet etching using the photoresist layer as a mask, a portion of the flexible layer is removed to form a patterned flexible layer, wherein the wet etching is stopped on the reflective layer. The photoresist layer is removed. By performing a dry etching using the patterned flexible layer as a mask, a portion of the reflective layer is removed to form a patterned reflective layer, wherein a mechanical layer is formed with the patterned flexible layer and the patterned reflective layer. The sacrificial layer is removed and thus the mechanical layer is supported by the posts.

In another embodiment of forming a microelectromechanical optical display device, removal of the photoresist layer can be subsequent to formation of the patterned reflective layer.

The mechanical layer comprising the patterned flexible layer defined by wet etching and the patterned reflective layer defined by dry etching can thus be formed without undercut issue during fabrication, improving yield and device performance.

DESCRIPTION OF THE DRAWINGS

The invention will become more fully understood from the detailed description given in the following and the accompanying drawings, given by way of illustration only and thus not intended to be limitative, and wherein.

DETAILED DESCRIPTION

First Embodiment

Methods of forming microelectromechanical optical (MEMO) display devices are provided. The MEMO display devices can be interference modulators. FIGS. 2A-2G are sectional views of a first embodiment of a manufacturing process for fabricating an embodiment of a MEMO display device. A representative interference modulator is illustrated, but is not intended to limit the disclosure. In order to simplify the illustration, FIGS. 2A-2G show one pixel, although there may be numerous pixels.

Figure 1:
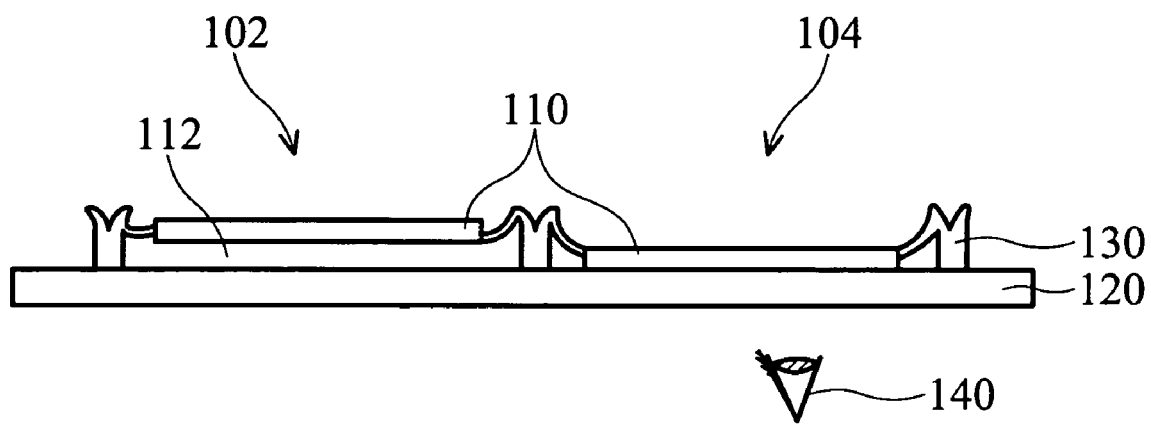
FIG. 1 shows a side view of a conventional interference modulator in two states.
Figure 2A:
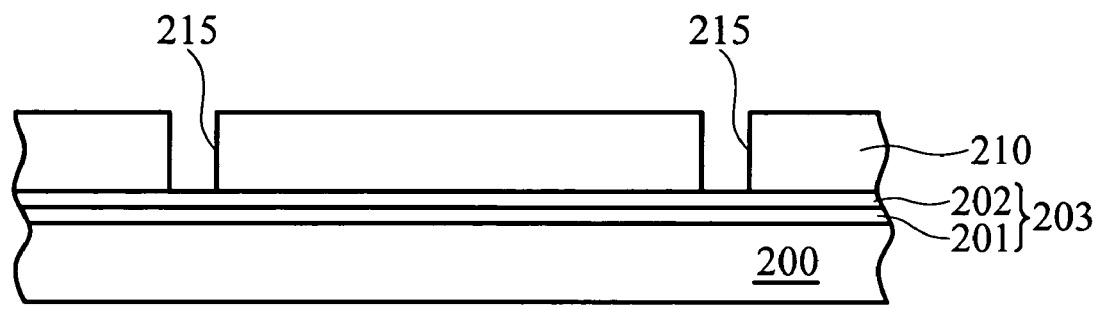
FIGS. 2A-2G are sectional views of a first embodiment of a manufacturing process for fabricating an embodiment of a MEMO display device.

In FIG. 2A, an optical stack layer 203 is formed on a transparent substrate 200. An exemplary method of forming the optical stack is described as follows. A transparent conductive layer 201 is formed on the substrate 200 by, for example, evaporation and deposition. A dielectric layer 202 is then formed on the transparent conductive layer 201 by, for example, deposition. In this embodiment, the optical stack layer 203 comprises the transparent conductive layer 201 and the dielectric layer 202. The substrate 200 can be a glass, quartz, mylar or plastic substrate. The material of the transparent conductive layer 201 can be indium-tin-oxide (ITO), indium-zinc-oxide (IZO) or other transparent metals. The material of the dielectric layer 202 can be aluminum oxide, silicon oxide, silicon nitride, silicon oxynitride or other transparent dielectric materials.

A sacrificial layer 210 is then formed on the optical stack layer 203. The sacrificial layer 210 can be a molybdenum or amorphous silicon layer formed by, for example, deposition. By performing conventional photolithography and etching processes, a plurality of holes 215 exposing the optical stack layer 203 are formed in the sacrificial layer 210.

Figure 2B:
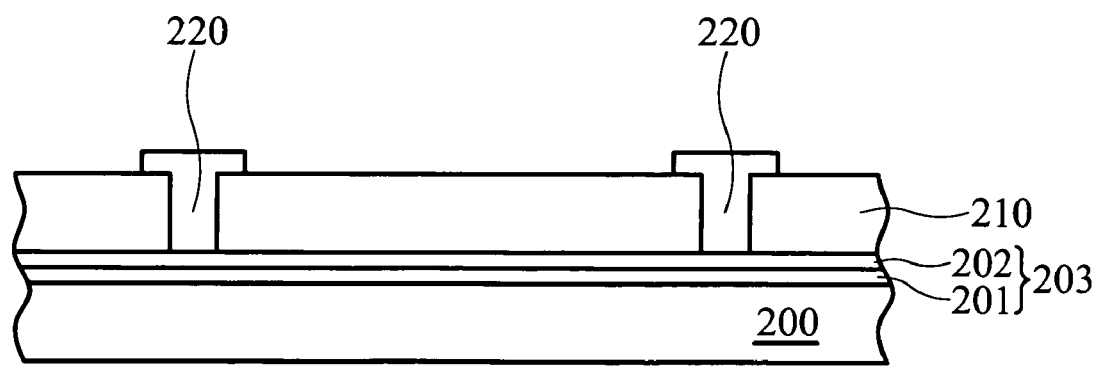

A supporting material such as photoresist or polymer fills in the holes 215. Conventional photolithography and etching processes are then performed to define a plurality of posts 220 attached the optical stack layer 203, as shown in FIG. 2B.

Figure 2C:
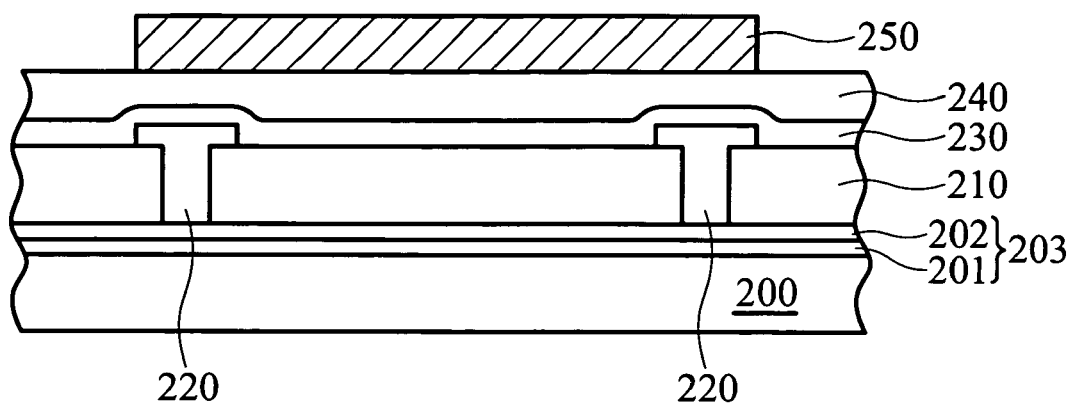

In FIG. 2C, a reflective layer 230 is formed on the sacrificial layer 210 and the posts 220. A flexible layer 240 is then formed on the reflective layer 230. In this embodiment, the reflective layer 230 can be an aluminum layer, a silver layer or other metal layer with high reflectivity formed by, for example, sputtering. The flexible layer 240 can be a nickel layer, a titanium layer or other metal layer with exceptional mechanical strength. By performing coating and patterning, a photoresist layer 250 is then formed on a portion of the flexible layer 230.

Figure 2D:
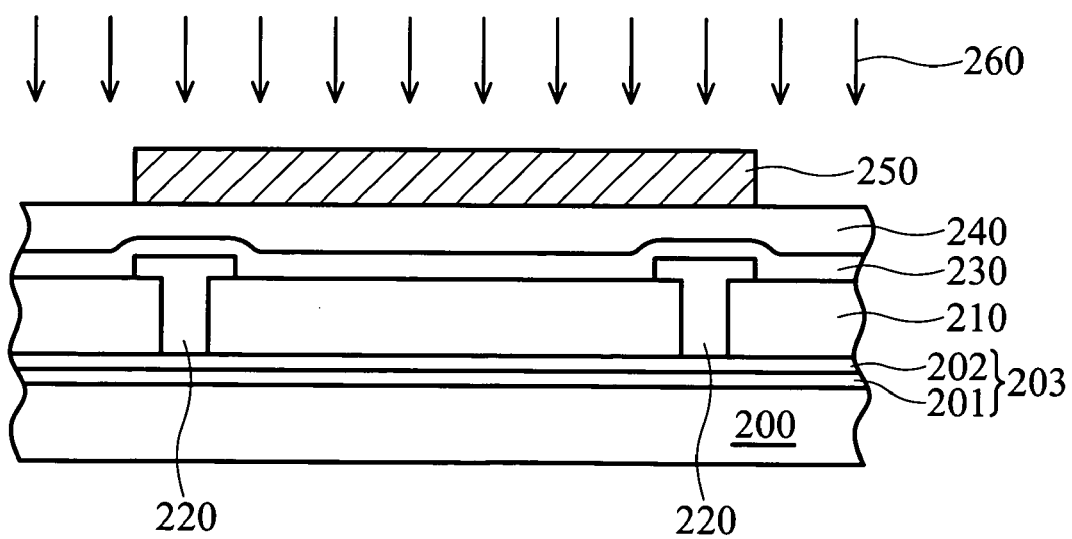
Figure 2E:
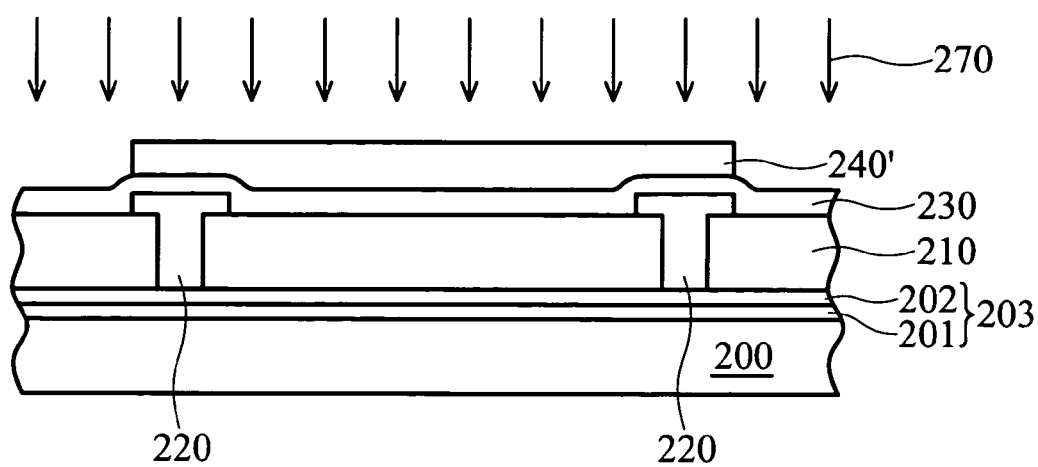

Referring to FIG. 2D, by performing a wet etching 260 using the photoresist layer 250 as a mask, a portion of the flexible layer 240 is removed to form a patterned flexible layer 240' (shown in FIG. 2E). The wet etching 260 is stopped on the reflective layer 230. The etching selectivity of the flexible layer 240 over the reflective layer 230 is greater than or equal to 1, preferably greater than or equal to 5, in the step of wet etching 260. When the flexible layer 240 is a nickel layer or a titanium layer, the wet etching 260 can employ a $HNO_3$ solution.

The photoresist layer 250 is then removed by performing an ashing process, such that a structure shown in FIG. 2E is obtained.

Figure 2F:
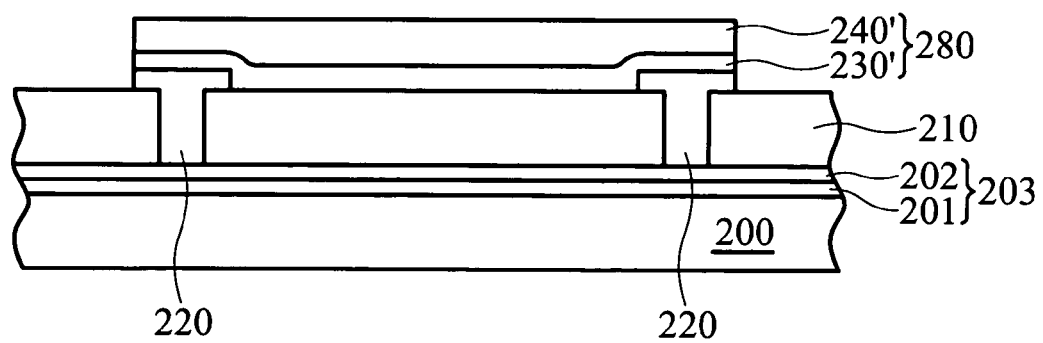

Referring to FIG. 2E, by performing a dry etching 270 (i.e. anisotropic etching) using the patterned flexible layer 240' as a mask, a portion of the reflective layer 230 is removed to form a patterned reflective layer 230'. In this embodiment, a mechanical layer 280 (or mirror plate) is formed with the patterned flexible layer 240' and the patterned reflective layer 230', as shown in FIG. 2F. When the reflective layer 230 is an aluminum layer, a silver layer or other metal layer, the dry etching 270 can employ an etching gas comprising $Cl_2$, $BCl_3$, $O_2$, He and $CF_4$, or comprising $SF_6$, $O_2$, He and $CF_4$. Note that this embodiment employs double etching stages (i.e. wet etching and dry etching) such that the profile of the mechanical layer 280 can be precisely controlled without etch undercut during fabrication, improving yield and device performance.

Figure 2G:
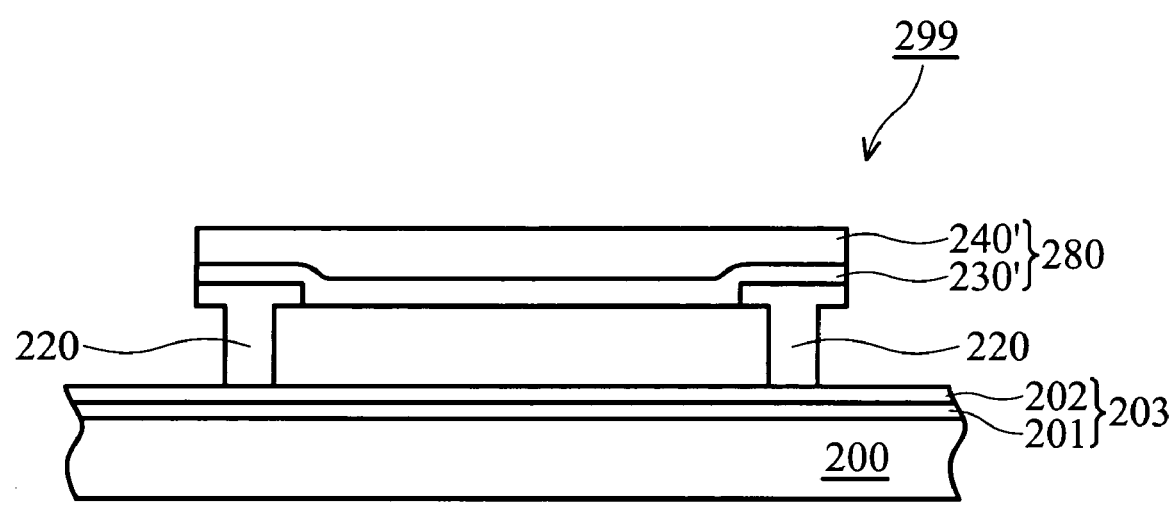

In FIG. 2G, the remains of sacrificial layer 210 are removed by, for example, a $XeF_2$, $BrF_3$, $ClF_3$, $BrF_5$ or $IF_5$ etcher to release the mechanical layer 280. That is, the mechanical layer 280 is supported by the posts 220. An interference modulator 299 is thus obtained.

Second Embodiment

FIGS. 3A-3G are sectional views of a second embodiment of a manufacturing process for fabricating an embodiment of a MEMO display device. A representative interference modulator is illustrated, but is not intended to limit the disclosure. In order to simplify the illustration, FIGS. 3A-3G show one pixel, although there may be numerous pixels. In this embodiment, removal of the photoresist layer occurs subsequent to formation of the patterned reflective layer.

Figure 3A:
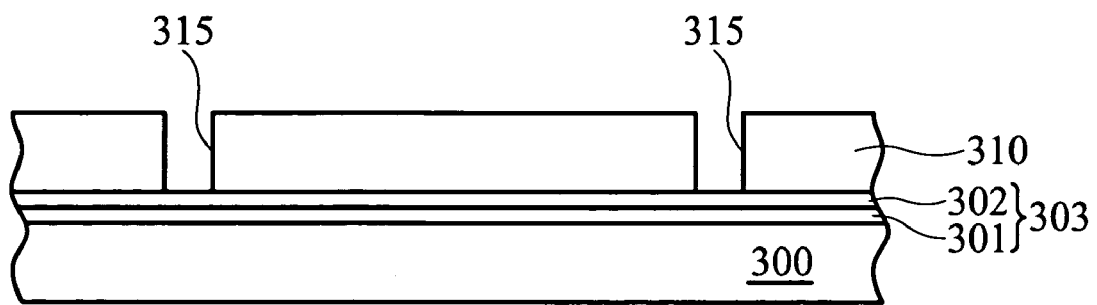
FIGS. 3A-3G are sectional views of a second embodiment of a manufacturing process for fabricating an embodiment of a MEMO display device.

In FIG. 3A, an optical stack layer 303 is formed on a transparent substrate 300. An exemplary method of forming the optical stack is described as follows. A transparent conductive layer 301 is formed on the substrate 300 by, for example, evaporation and deposition. A dielectric layer 302 is then formed on the transparent conductive layer 301 by, for example, deposition. In this embodiment, the optical stack layer 303 comprises the transparent conductive layer 301 and the dielectric layer 302. The substrate 300 can be a glass, quartz, mylar or plastic substrate. The material of the transparent conductive layer 301 can be ITO, IZO or other transparent metals. The material of the dielectric layer 302 can be aluminum oxide, silicon oxide, silicon nitride, silicon oxynitride or other transparent dielectric materials.

A sacrificial layer 310 is then formed on the optical stack layer 303. The sacrificial layer 310 can be a molybdenum layer or an amorphous silicon layer formed by, for example, deposition. By performing conventional photolithography and etching processes, a plurality of holes 315 exposing the optical stack layer 303 are formed in the sacrificial layer 310.

Figure 3B:
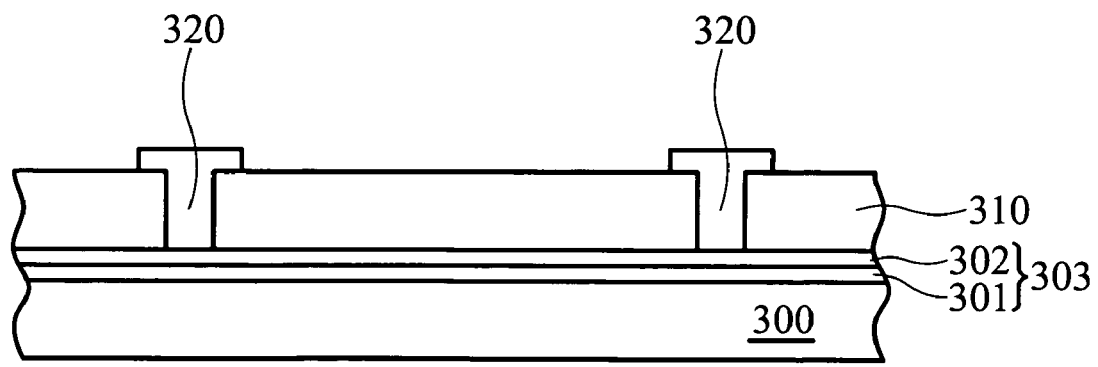

A supporting material, such as photoresist or polymer, fills in the holes 315. Conventional photolithography and etching processes are then performed to define a plurality of posts 320, as shown in FIG. 3B.

Figure 3C:
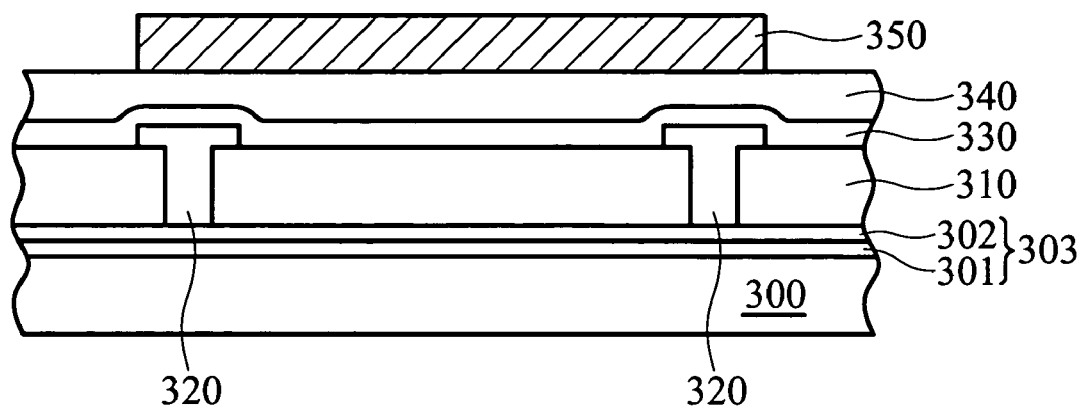

In FIG. 3C, a reflective layer 330 is formed on the sacrificial layer 310 and the posts 320. A flexible layer 340 is then formed on the reflective layer 330. In this embodiment, the reflective layer 330 can be an aluminum layer, a silver layer or other metal layer with high reflectivity formed by, for example, sputtering. The flexible layer 340 can be a nickel layer, a titanium layer or other metal layer with exceptional mechanical strength. By performing coating and patterning, a photoresist layer 350 is then formed on a portion of the flexible layer 330.

Figure 3D:
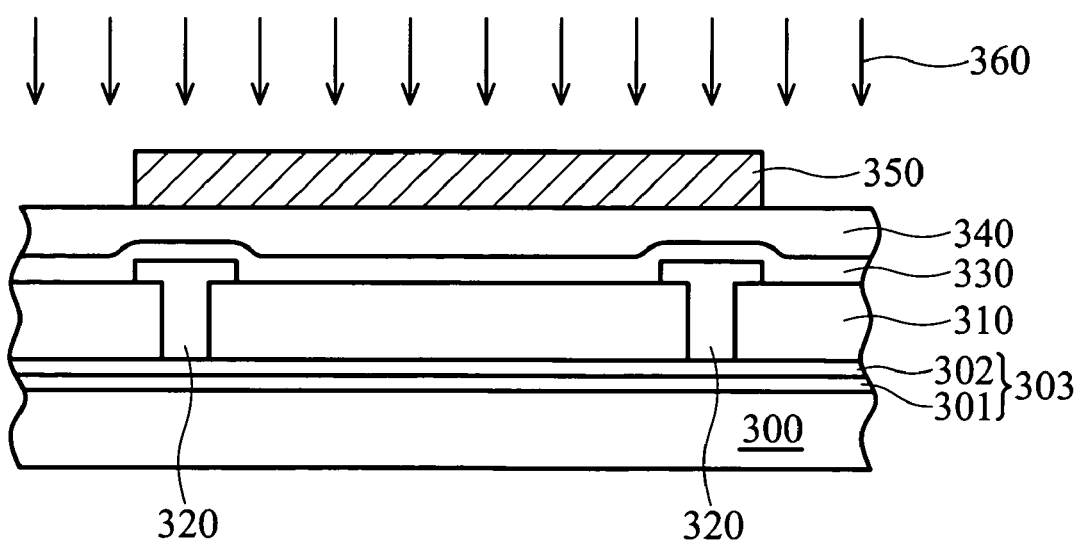
Figure 3E:
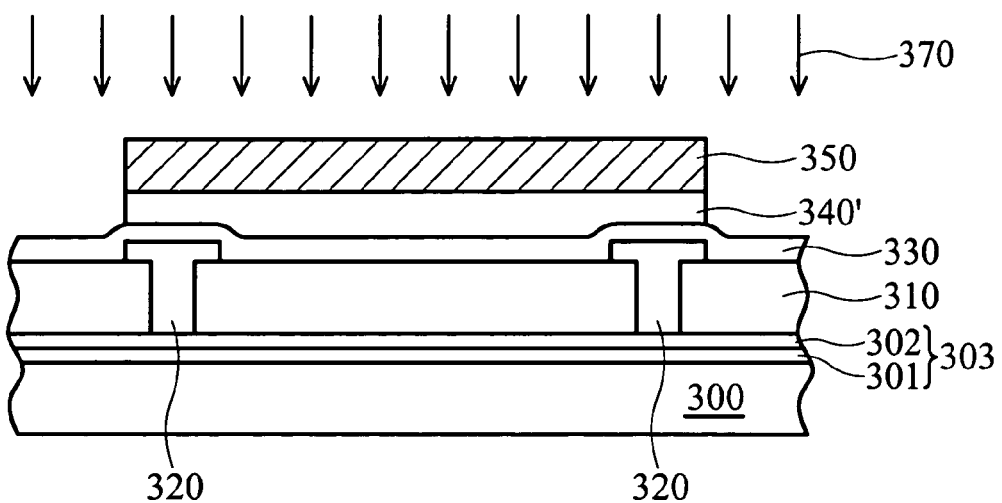

Referring to FIG. 3D, by performing a wet etching 360 using the photoresist layer 350 as a mask, a portion of the flexible layer 340 is removed to form a patterned flexible layer 340' (shown in FIG. 3E). The wet etching 360 is stopped on the reflective layer 330. The etching selectivity of the flexible layer 340 over the reflective layer 330 is greater than or equal to 1, preferably, greater than or equal to 5, in the step of wet etching 360. When the flexible layer 340 is a nickel layer or a titanium layer, the wet etching 360 can employ a $HNO_3$ solution.

Figure 3F:
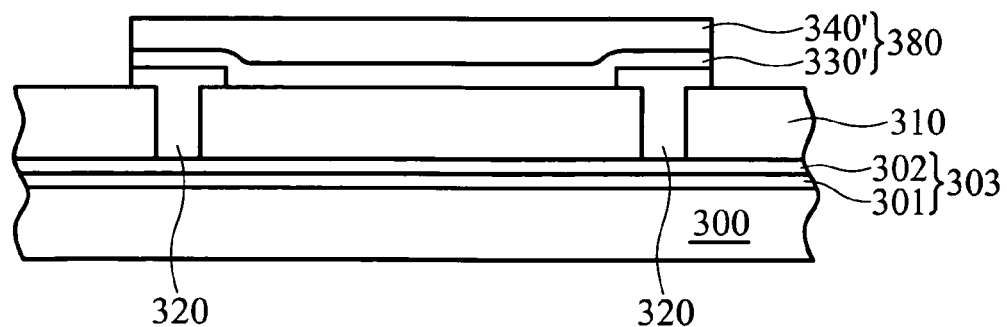

Referring to FIG. 3E, by performing a dry etching 370 (i.e. anisotropic etching), using the photoresist layer 350 and the patterned flexible layer 340' as a mask, a portion of the reflective layer 330 is removed to form a patterned reflective layer 330'. In this embodiment, a mechanical layer 380 (or mirror plate) is formed with the patterned flexible layer 340' and the patterned reflective layer 330', as shown in FIG. 3F. When the reflective layer 330 is an aluminum layer, a silver layer or other metal layer, the dry etching 370 can employ an etching gas comprising $Cl_2$, $BCl_3$, $O_2$, He and $CF_4$ or comprising $SF_6$, $O_2$, He and $CF_4$. Note that this embodiment employs double etching stages (i.e. wet etching and dry etching) such that the profile of the mechanical layer 380 can be precisely controlled without etch undercut during fabrication, improving yield and device performance.

After formation of the mechanical layer 380, the photoresist layer 350 is then removed by performing an ashing process. A structure shown in FIG. 3F is thus obtained.

Figure 3G:
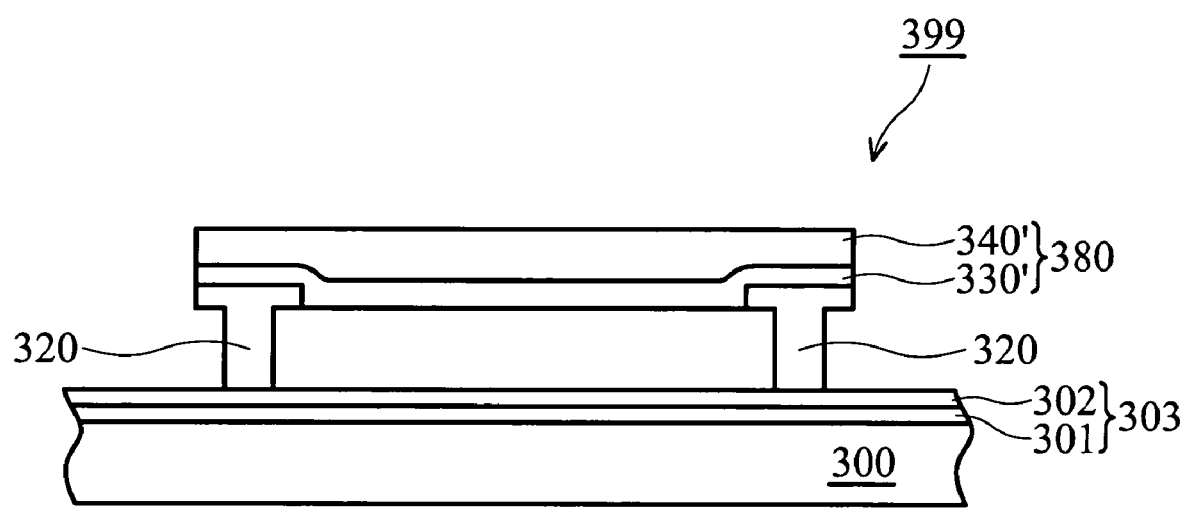

In FIG. 3G, the remained portion of sacrificial layer 310 is removed by, for example, a $XeF_2$, $BrF_3$, $ClF_3$, $BrF_5$ or $IF_5$ etcher to release the mechanical layer 380. Significantly, the mechanical layer 380 is supported by the posts 320. An interference modulator 399 is thus obtained.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of forming a microelectromechanical optical (MEMO) display device, comprising:
   forming an optical stack layer on a substrate;
   forming a sacrificial layer on the optical stack layer;
   patterning the sacrificial layer to form a plurality of holes therein;
   filling a supporting material in the holes to form a plurality of posts;
   forming a reflective layer on the sacrificial layer and the posts;
   forming a flexible layer on the reflective layer;
   forming a photoresist layer on a portion of the flexible layer;
   performing a wet etching using the photoresist layer as a mask to remove a portion of the flexible layer to form a patterned flexible layer, wherein the wet etching is stopped on the reflective layer;
   removing the photoresist layer;
   performing a dry etching using the patterned flexible layer as a mask to remove a portion of the reflective layer to form a patterned reflective layer, wherein a mechanical layer is formed with the patterned flexible layer and the patterned reflective layer; and
   removing the sacrificial layer and thus the mechanical layer is supported by the posts.

2. The method according to claim 1, wherein the substrate is transparent.

3. The method according to claim 1, wherein formation of the optical stack layer comprises:
   forming a transparent conductive layer on the substrate; and
   forming a dielectric layer on the transparent conductive layer.

4. The method according to claim 1, wherein the sacrificial layer comprises molybdenum or silicon.

5. The method according to claim 1, wherein the posts comprise polymer.

6. The method according to claim 1, wherein the reflective layer comprises aluminum or silver and the flexible layer comprises nickel or titanium.

7. The method according to claim 1, wherein the wet etching employs $HNO_3$ solution.

8. The method according to claim 1, wherein the dry etching employs an etching gas comprising $Cl_2$, $BCl_3$, $O_2$, He and $CF_4$.

9. The method according to claim 1, wherein the dry etching employs an etching gas comprising $SF_6$, $O_2$, He and $CF_4$.

10. The method according to claim 1, wherein an etching selectivity of the flexible layer over the reflective layer is greater than 1 in the step of wet etching.

11. The method according to claim 10, wherein the etching selectivity is greater than or equal to 5.

12. The method according to claim 1, wherein removal of the photoresist layer is subsequent to formation of the patterned reflective layer.

13. A method of forming a microelectromechanical optical (MEMO) display device, comprising:
   forming an optical stack layer on a substrate; and
   forming an optical device comprising a mechanical layer over the optical stack layer, wherein formation of the mechanical layer comprises:
   sequentially forming a reflective layer and a flexible layer above the optical stack layer;
   forming a photoresist layer on a portion of the flexible layer;
   performing a wet etching using the photoresist layer as a mask to remove a portion of the flexible layer to form a patterned flexible layer, wherein the wet etching is stopped on the reflective layer;
   removing the photoresist layer; and
   performing a dry etching using the patterned flexible layer as a mask to remove a portion of the reflective layer to form a patterned reflective layer.

14. The method according to claim 13, wherein the substrate is transparent.

15. The method according to claim 13, wherein formation of the optical stack layer comprises:
   forming a transparent conductive layer on the substrate; and
   forming a dielectric layer on the transparent conductive layer.

16. The method according to claim 13, wherein the reflective layer comprises aluminum or silver, and the flexible layer comprises nickel or titanium.

17. The method according to claim 13, wherein the wet etching employs $HNO_3$ solution.

18. The method according to claim 13, wherein the dry etching employs an etching gas comprising $Cl_2$, $BCl_3$, $O_2$, He and $CF_4$.

19. The method according to claim 13, wherein the dry etching employs an etching gas comprising $SF_6$, $O_2$, He and $CF_4$.

20. The method according to claim 13, wherein an etching selectivity of the flexible layer over the reflective layer is greater than 1 in the step of wet etching.

21. The method according to claim 20, wherein the etching selectivity is greater than or equal to 5.

22. The method according to claim 13, wherein removal of the photoresist layer is subsequent to formation of the patterned reflective layer.

23. The method according to claim 1, wherein sidewalls of the patterned flexible layer and the patterned reflective layer are substantially coplanar.

24. The method according to claim 1, wherein removing the photoresist layer is performed before performing the dry etching using the patterned flexible layer as the mask.

* * * * *